United States Patent [19]
Elder et al.

[11] Patent Number: 4,842,345
[45] Date of Patent: Jun. 27, 1989

[54] TRACK LINK ADHESION PAD ASSEMBLY

[75] Inventors: James W. Elder, Reading; Robert A. Parker, Camberley, both of England

[73] Assignee: The Secretary of State for Defence in Her Majesty's Government of the United Kingdom of Great Britain and Northern Ireland, London, United Kingdom

[21] Appl. No.: 89,018

[22] Filed: Aug. 24, 1987

Related U.S. Application Data

[63] Continuation of Ser. No. 592,597, Mar. 23, 1984, abandoned.

[30] Foreign Application Priority Data

Mar. 30, 1983 [GB] United Kingdom ............... 8308828

[51] Int. Cl.⁴ .......................................... B62D 55/205
[52] U.S. Cl. .................................... 305/35 R; 305/51
[58] Field of Search .................... 305/35 R, 38, 51, 54, 305/39, 46

[56] References Cited

U.S. PATENT DOCUMENTS

| | | | |
|---|---|---|---|
| 3,261,646 | 7/1966 | Pax | 305/35 R |
| 3,475,060 | 10/1969 | Kaifesh | 305/35 R |
| 4,390,214 | 6/1983 | Gunter et al. | 305/35 R |
| 4,444,441 | 4/1984 | Parker | 305/35 R |
| 4,461,516 | 7/1984 | Lee | 305/51 X |

FOREIGN PATENT DOCUMENTS

| | | | |
|---|---|---|---|
| 0078635 | 5/1983 | European Pat. Off. | |
| 203896 | 7/1907 | Fed. Rep. of Germany | |
| 1605521 | 9/1970 | Fed. Rep. of Germany | 305/38 |
| 2600243 | 7/1977 | Fed. Rep. of Germany | 305/54 |
| 86667 | 9/1920 | Switzerland | |
| 794074 | 4/1958 | United Kingdom | |
| 896300 | 5/1962 | United Kingdom | |
| 2017021 | 9/1979 | United Kingdom | |

Primary Examiner—Johnny D. Cherry
Assistant Examiner—Russell D. Stormer
Attorney, Agent, or Firm—William R. Hinds

[57] ABSTRACT

An adhesion pad assembly for tracked vehicles includes a resilient adhesion pad having a ground engageable face, the pad being laterally confined by an encasement having side walls of a material having greater tear strength and less abrasion resistance than the material of the pad. The encasement provides protection to the pad from tearing by stones as well as reducing deformation heating.

18 Claims, 3 Drawing Sheets

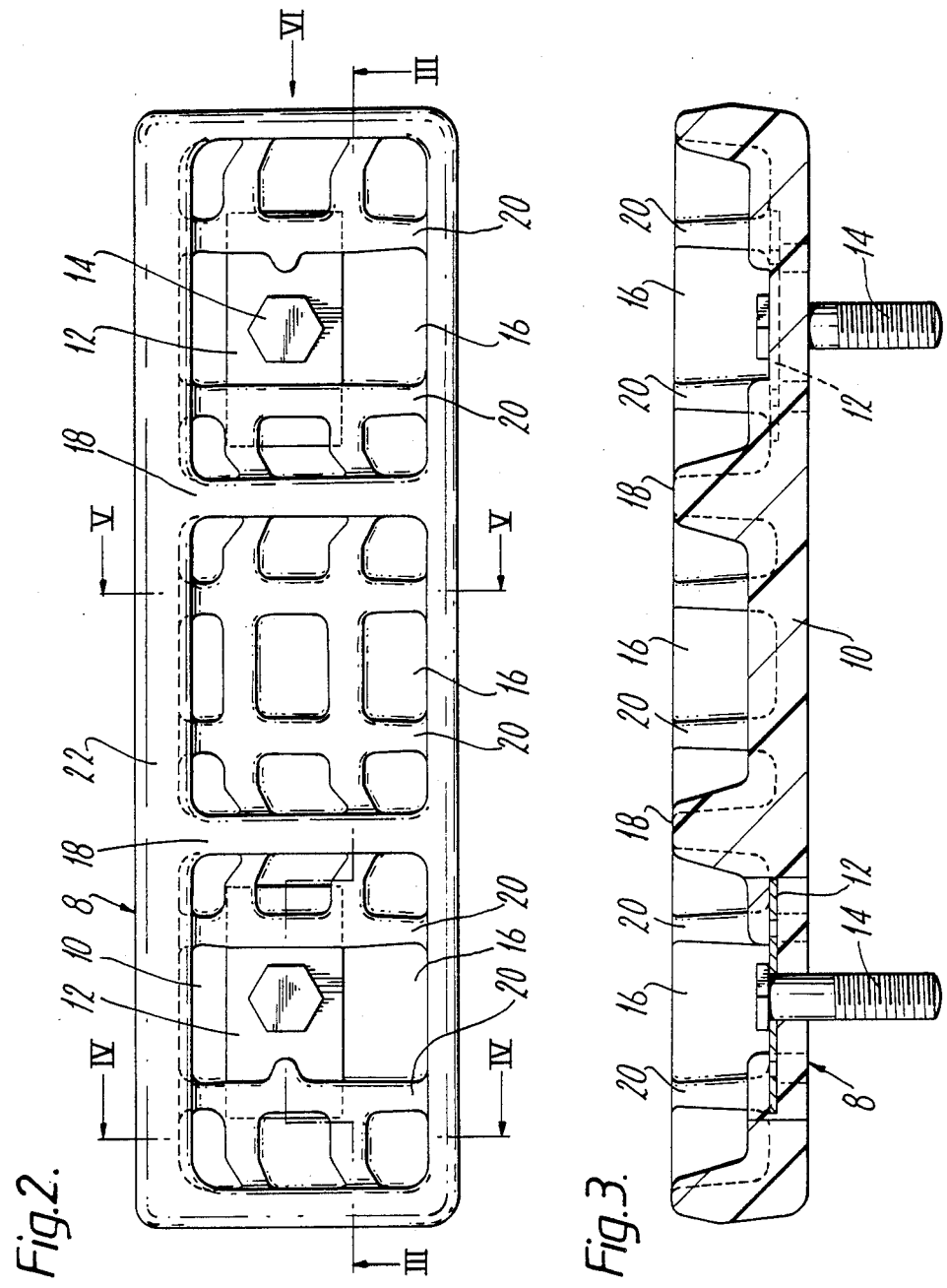

TRACK LINK ADHESION PAD ASSEMBLY

This application is a continuation of application Ser. No. 592,597, filed Mar. 23, 1984, and now abandoned.

This invention relates to adhesion pads for attachment to the track links of tracked vehicles.

It is known to increase the grip of tracked vehicles on man-made surfaces such as metalled or concrete roads by attaching adhesion pads to the track links. Known pads comprise solid rubber blocks fixed to the track links by bolts anchored to metal plates bonded to the bases of the blocks, by slotting the blocks into retaining guides in the track links or by direct bonding to the track links.

The edges of such adhesion pads are particularly vulnerable to tearing by sharp stones or similar objects; if a vehicle is required to manoeuvre on stony terrain as well as man-made roads the pads will wear especially rapidly. Further, because these pads are able to deform throughout most of their volume they heat up under the repeated application of the vehicle's weight when the vehicle is moving over any relatively firm surface. This rise in temperature reduces the strength of the pads and their resistance to wear.

It is an object of the present invention to provide a track link adhesion pad assembly that largely overcomes these disadvantages. Accordingly, there is provided an adhesion pad assembly for a track link of a tracked vehicle which includes a resilient adhesion pad having a ground engageable face, a rigid encasement having side walls of a material having greater tear strength and less abrasion and wear resistance than the material of the adhesion pad such that in use the encasement material wears more rapidly than the pad such that the face of the pad after a period of use will be domed with its peripheral areas substantially flush with the encasement, the adhesion pad being laterally confined at its peripheral area by the side walls of the encasement through substantially the whole thickness of the pad so as to be engageable with the ground.

Preferably the encasement is made of nylon and the adhesion pad of solid, natural rubber. The adhesion pad may conveniently be moulded to be flush with the encasement. Because the encasement abrades more readily than the adhesion pad in use the pad becomes generally dome-shaped with the edges of its ground engageable face approximately level with the edges of the side walls of the encasement. The encasement provides a large degree of protection to the edges of the pad against tearing whilst maintaining the pad in contact with the ground so that it supports substantially all the load exerted on the adhesion pad assembly. Once the adhesion pad becomes dome-shaped the impact of the encasement on hard surfaces when the vehicle is moving is reduced thereby reducing impact cracking of the encasement. Preferably the adhesion pad is formed into such a dome-shape during manufacture to provide maximum protection to the encasement from the initial attachment of the adhesion pad assembly to the track link.

Because the encasement confines the adhesion pad laterally, the pad can deform in the region of the ground engageable face only and so heats up less when the vehicle is in motion than a similar, but unencased, adhesion pad.

The adhesion pad may be injection moulded into the encasement or pre-formed and bonded into place. The encasement may conveniently have a base integral with the encasement walls with metal plates set into the base of the encasement during casting to provide anchorages for bolts by which the adhesion pad assembly can be attached to the track link. Alternatively, the encasement may be cast to fit retaining guides in the track links or the encasement moulded directly onto the track link.

In a preferred embodiment the adhesion pad assembly is formed from several, integrally moulded encasements to form a compartmentalised structure with an adhesion pad in each encasement. The additional walls of this structure act as stiffening members allowing the encasements to be manufactured with sufficient rigidity substantially to prevent lateral deformation of the adhesion pad under load whilst having walls that need be no thicker than are necessary to provide the required amount of protection against damage by stones. Each encasement may be provided with stiffening members between the base and the walls.

An embodiment of the invention will now be described by way of example only with reference to the accompanying drawings of which:

FIG. 2 is a plan view of the compartmentalised structure of FIG. 1;

FIG. 3 is a longitudinal section on the line III—III of FIG. 2;

Figure 1:
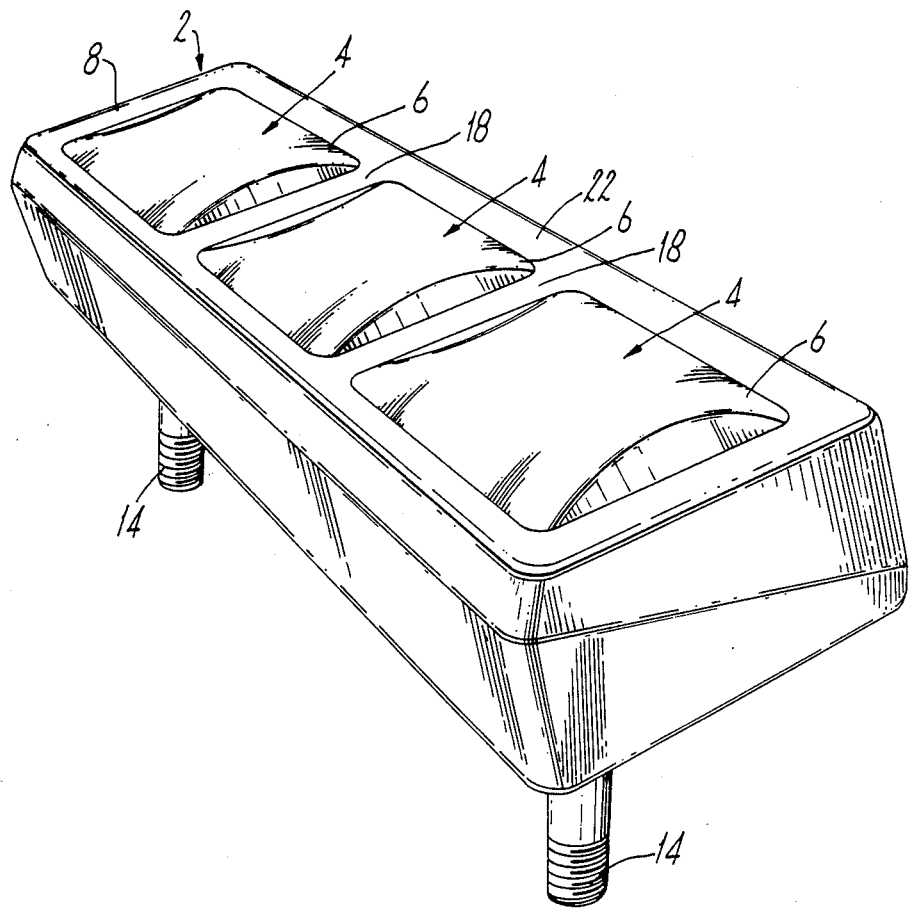
FIG. 1 is a perspective view of a track link adhesion pad assembly having three solid rubber adhesion pads located in a compartmentalised structure comprising three integrally moulded encasements.
Figure 4:
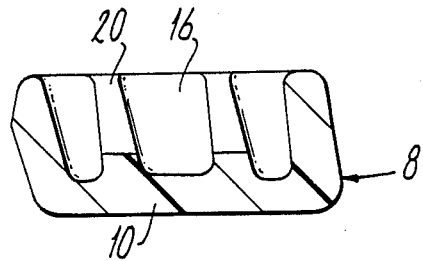
FIG. 4 is a transverse section on the line IV—IV of FIG. 2.
Figure 5:
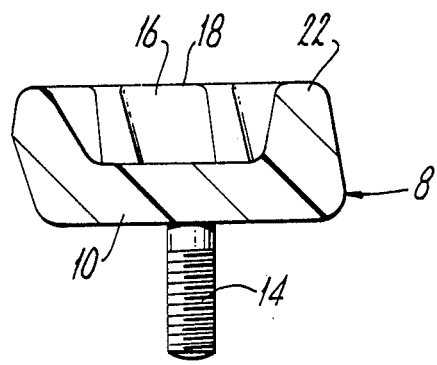
FIG. 5 is a transverse section on the line V—V of FIG. 2.
Figure 6:
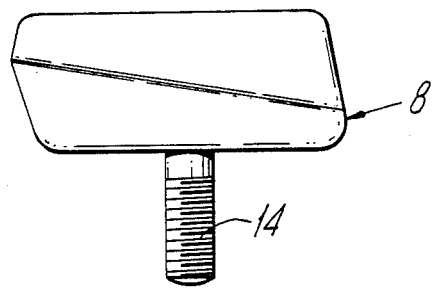
FIG. 6 is an end elevation of the compartmentalised structure of FIG. 1 viewed in the direction VI of FIG. 2.

There is shown in FIG. 1 a track link adhesion pad assembly 2 having three resilient natural rubber pads 4 with ground engageable faces 6 that have been injection moulded into a nylon compartmentalised structure 8 comprising three integrally moulded encasements 16 as shown in detail in FIGS. 2, 3, 4, 5 and 6. The encasements 16 have been cast with a common, integral base 10 in which have been set two metal plates 12 to provide anchorages for two fixing bolts 14. The encasements 16 are provided with additional rigidity by stiffening ribs 20.

The ground engageable faces 6 of the adhesion pads 4 are moulded to stand proud of the encasements 16 to reduce the initial impact damage to the encasement 16 in use after fixing to a track link (not shown).

Whichever edge of the adhesion pad assembly 2 strikes the ground first is the edge most likely to be damaged by sharp stones. The compartmentalised structure 8 is therefore provided with a wall 22 that is thicker than the remaining walls of the encasements, the adhesion pad assembly 2 being attached to the track link so that the wall 22 strikes the ground first when the vehicle is moving forwards.

An adhesion pad assembly according to the present invention has a greater shear strength than an unclad adhesion pad so the adhesion pad assembly can be made with an adhesion pad having a smaller ground engageable face whilst still being able to support the shear stresses generated between the vehicle and the ground. This can result in a considerable weight saving.

Because the adhesion pad of the present invention does not heat up as much as an unclad adhesion pad, materials having good adhesive qualities but whose strengths deteriorate rapidly with increasing temperature may now be used.

We claim:

1. An adhesion pad assembly for a track link of a tracked vehicle including:
   a resilient adhesion pad having a ground engageable face;
   a rigid encasement having side walls of a material having greater tear strength and less abrasion resistance and lower wear resistance than the material of the adhesion pad such that in use the encasement material wears more rapidly than the pad such that the face of the pad after a period of use will be domed with its peripheral areas substantially flush with the encasement;
   the adhesion pad being laterally confined at its peripheral area by the said side walls of the encasement through substantially the whole thickness of the pad so as to be engageable with the ground.

2. An adhesion pad assembly as claimed in claim 1 in which the encasement has a first and a second side wall each disposed in use substantially normal to the direction of motion of the track link, the first side wall being thicker than the second side wall.

3. An adhesion pad assembly as claimed in claim 1 in which the encasement has a base in contact with the adhesion pad.

4. An adhesion pad assembly as claimed in claim 3 in which the encasement is provided with stiffening members inter-connecting the base and the side walls thereof.

5. An adhesion pad assembly as claimed in claim 3 in which the base is provided with attachment means whereby the adhesion pad assembly may be attached to the track link.

6. An adhesion pad assembly as claimed in claim 1 in which there are at least two encasements having a common side wall.

7. An adhesion pad assembly as claimed in claim 1 wherein said adhesion pad is of rubber material and said encasement material is a plastic.

8. An adhesion pad assembly as claimed in claim 7 wherein said encasement material is nylon.

9. An adhesion pad assembly for a track link of a tracked vehicle including:
   a resilient adhesion pad having a ground engageable face;
   a rigid encasement having side walls of a material having greater tear strength and less abrasion resistance and lower wear resistance than the material of the adhesion pad such that in use the encasement material wears more rapidly than the pad such that the face of the pad after a period of use will be domed with its peripheral areas substantially flush with the encasement;
   said side walls laterally confining the adhesion pad at its peripheral area and extending to the level of the ground engagable face of the pad at least at the ground impacting edges of the pad so as to be engageable with the ground and so as to restrain the pad from lateral deformation throughout substantially the whole of its thickness both before and after wear of the pad and the confining side walls of the encasement.

10. An adhesion pad assembly as claimed in claim 9 wherein after wear in use, said pad becomes generally dome-shaped with the edges of its ground engagable face approximately level with the edges of the side walls of the encasement.

11. An adhesion pad assembly as claimed in claim 9 wherein said pad as manufactured is generally dome-shaped with the edges of its ground engageable face approximately level with the edges of the side walls of the encasement.

12. An adhesion pad assembly as claimed in claim 9 in which the encasement has a first and a second side wall each disposed in use substantially normal to the direction of motion of the track link, the first side wall being thicker than the second side wall.

13. An adhesion pad assembly as claimed in claim 9 in which the encasement has a base in contact with the adhesion pad.

14. An adhesion pad assembly as claimed in claim 13 in which the encasement is provided with stiffening members interconnecting the base and the side walls thereof.

15. An adhesion pad assembly as claimed in claim 13 in which the base is provided with attachment means whereby the adhesion pad assembly may be attached to the tracked link.

16. An adhesion pad assembly as claimed in claim 9 in which there are at least two encasements having a common side wall.

17. An adhesion pad assembly as claimed in claim 9 wherein said adhesion pad is of rubber material and said encasement material is a plastic.

18. An adhesion pad assembly as claimed in claim 17 wherein said encasement material is nylon.

* * * * *